March 29, 1927.
L. SHAUB ET AL
1,622,680
LOCKING DEVICE FOR PULLEYS
Filed Sept. 23, 1925
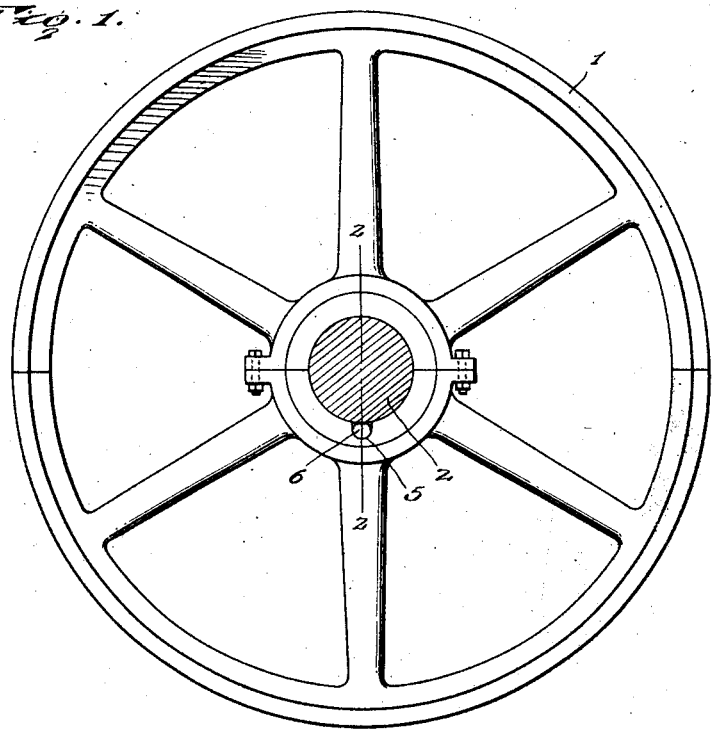
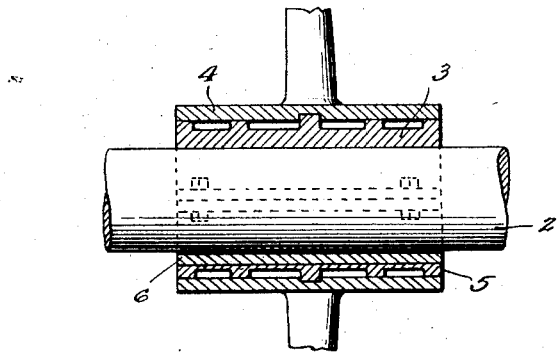
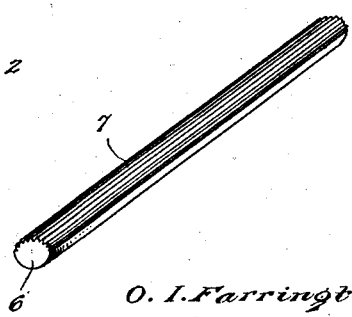
Inventors
O. I. Farringbore.
L. Shaub.
By
Lacey & Lacey, Attorney Patented Mar. 29, 1927.

1,622,680

UNITED STATES PATENT OFFICE.

LOUIS SHAUB AND OSCAR I. FARRINGTON, OF SALEM, MASSACHUSETTS.

LOCKING DEVICE FOR PULLEYS.

Application filed September 23, 1925. Serial No. 58,177.

Pulleys for line shafting are split or of sectional formation to enable them to be conveniently placed in position or removed without disturbing the shaft.

When the pulley is applied to the shaft it is necessary to secure it thereto to cause both to rotate together. The present invention relates to pulley securing means and provides for fastening the pulley to cause it to rotate with the shaft in either direction and to prevent movement thereof along the shaft after being secured thereto in the required adjusted position.

The invention is particularly designed for split or sectional pulleys but is not restricted to such use since it may be applied to pulleys and analogous parts adapted to be mounted upon shafts to rotate therewith.

One of the main features of the invention is locking means for a pulley or like part which is automatic in action, both in gripping and releasing the shaft, being dependent largely for its operation upon a cam action brought into play by the rotation of the pulley or corresponding part about the shaft or analogous support.

The invention provides simple and effective means embodying a key way in the shaft opening of the pulley and a key of uniform cross sectional outline throughout its length and reduced upon a side, so as to lie within the key way, but which when rotated in either direction operates by a binding action to grip the shaft and cause it and the pulley to rotate together.

The invention furthermore aims to provide a lock of the character aforesaid which is positive in action and which is effected by forming teeth along the reduced side of the key, said teeth resulting from forming a plurality of fine grooves along the reduced side of the key.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a complete understanding of the invention and the merits thereof, reference is to be had to the following description and to the drawings hereto attached, in which,—

Figure 1 is a side view of a split pulley showing the invention applied, the shaft upon which the pulley is mounted being in section, Figure 2 is a detail sectional view on the line 2—2 of Figure 1, and Figure 3 is a detail perspective view of the key.

Corresponding and like parts are referred to in the following description and designated in the several views of the drawings by like reference characters.

The numeral 1 designates a split pulley and 2 a line shafting upon which the pulley is mounted. Inasmuch as the invention is primarily designed for split pulleys it is shown in this application in the drawings. However, it is to be understood that the invention is equally well adapted for any type of pulley or analogous parts to be mounted upon a shaft to rotate therewith. As illustrated in the drawings, a metal box 3 is secured within the hub 4 of the pulley and this box has an opening of a size to snugly receive the shaft 2 upon which the pulley is to be mounted. A key way 5 is formed within the shaft opening and extends the length of the hub portion of the pulley, it being understood that in the event of the box being dispensed with, the key way will be formed directly in the shaft opening of the hub. The key way is of circular formation and the key 6 provided to cooperate therewith is of corresponding outline in cross section and is uniform throughout its length.

The key 6 is preferably of tool steel and tempered so as to withstand the stress to which it is subjected when in action. The key 6 is of a diameter to fit snugly within the key way 5 and a side is reduced to prevent its binding the shaft 2 when the key is adjusted so as to present the reduced side to the shaft. The reduced side of the key is milled or otherwise formed with a plurality of longitudinal grooves which form teeth 7 and these teeth bite into the surface of the shaft 2 and insure positive action of the key to cause the pulley and shaft to rotate together.

In the practical application of the invention, the pulley or analogous part is applied to the shaft in the usual way after which the key 6 is introduced into the key way 5 by a longitudinal sliding movement, the key being adjusted so that the reduced portion provided with the teeth 7 is opposite the shaft and after the key has been slipped into the key way the pulley is rotated in the desired direction which causes the key to partly turn in the key way and to operate by a cam or wedge action thereby gripping the shaft and causing the pulley to turn therewith. By having the reduced side portion of the key toothed, the teeth bite into the shaft and preclude possible slipping. It is observed that the key in cross section embodies a major and a minor axis, the minor axis being perpendicular to the reduced surface of the key and the major axis having the reduced surface comprised in its length. By having the teeth 7 bite into the surface of the shaft, the pulley or like part is prevented from moving axially of the shaft. As stated, the key is automatic in action and grips the shaft upon rotation of the pulley in either direction and this results from having the side of the key reduced upon opposite sides of the minor axis. Specifically considered the key is approximately of oval cross sectional outline throughout and the key way is substantially of U-shape, the depth corresponding with the minor axis of the key and the width with the major axis. In consequence the key has a snug fit in the seat and a maximum bearing which is essential when a Babbitt bushing is employed.

Having thus described the invention, we claim:

The combination with a shaft and a pulley thereon having a U-shaped groove extending throughout the length of the wall of the opening through which the shaft passes to form a keyway of a depth less than its width, of a key of uniform oval cross sectional outline throughout and insertable in the keyway from either end and having its minor and major axis corresponding to the depth and width of the key way, respectively.

In testimony whereof we affix our signatures.

LOUIS SHAUB.
OSCAR I. FARRINGTON.